Feb. 2, 1932. W. T. BIRDSALL 1,843,502
PROJECTOR
Filed June 8, 1926 2 Sheets-Sheet 1
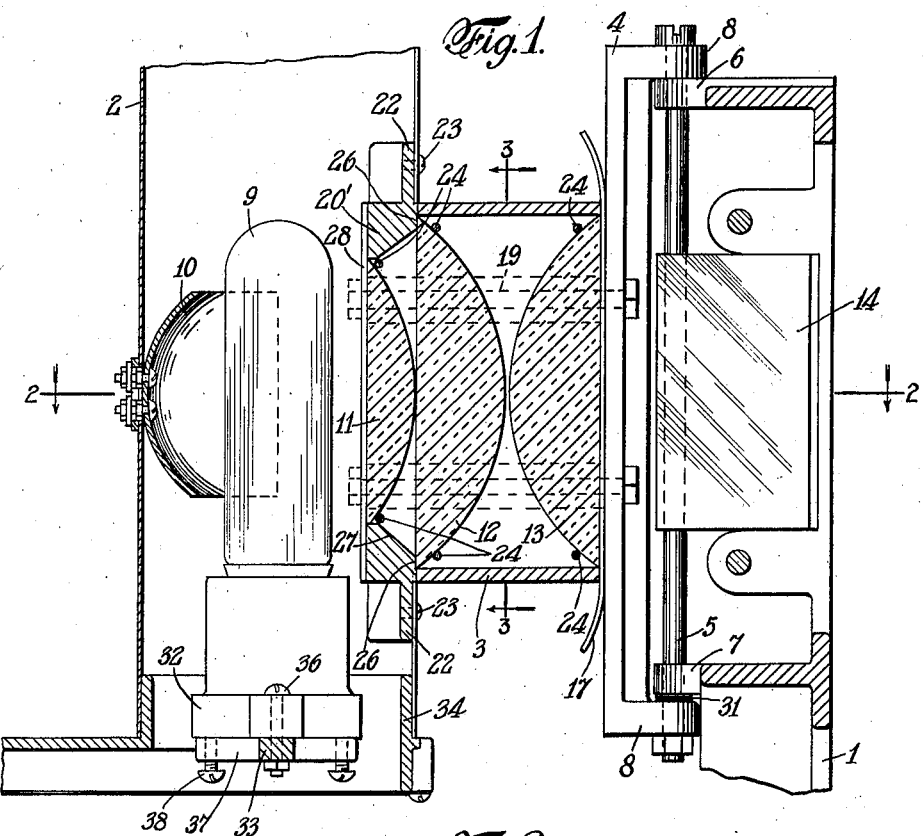
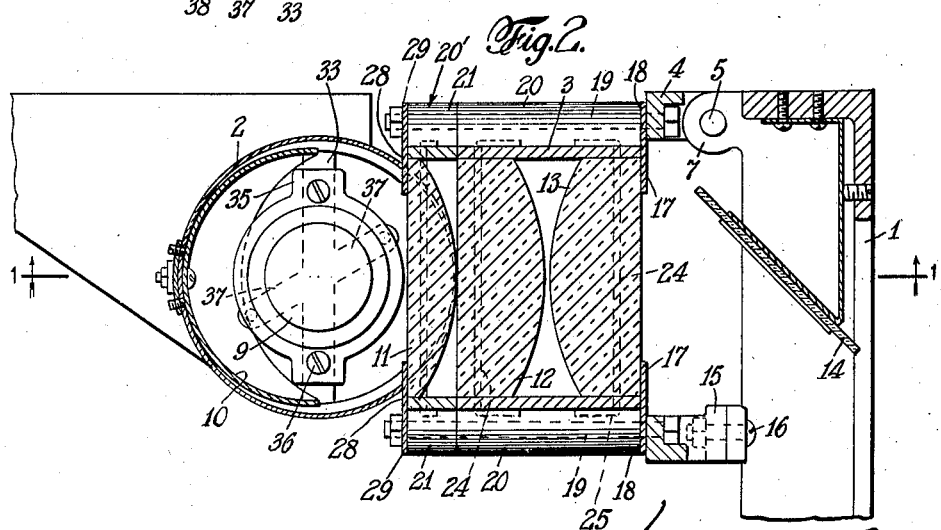

Feb. 2, 1932. W. T. BIRDSALL 1,843,502
PROJECTOR
Filed June 8, 1926 2 Sheets-Sheet 2
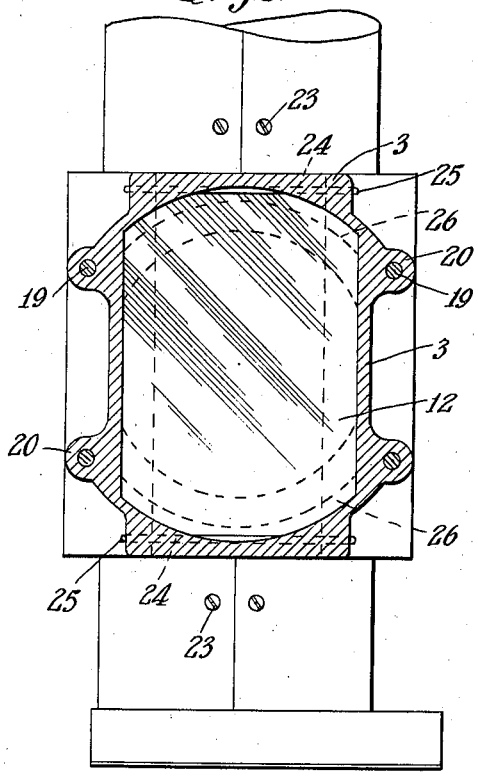
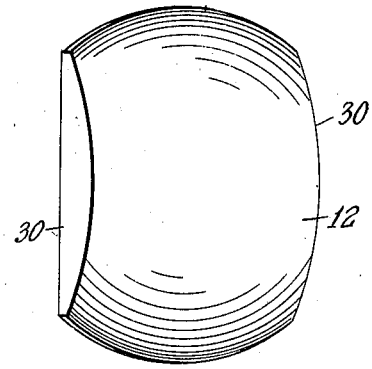
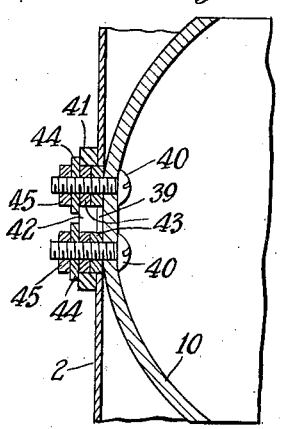
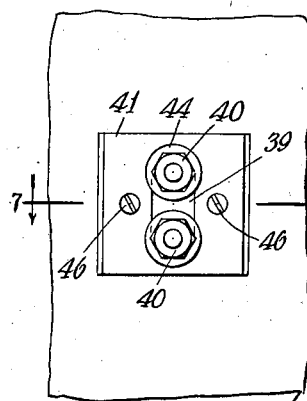
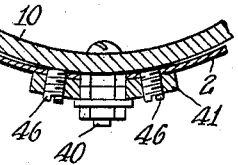

Patented Feb. 2, 1932

1,843,502

UNITED STATES PATENT OFFICE

WILFRED T. BIRDSALL, OF MONTCLAIR, NEW JERSEY, ASSIGNOR TO TRANS-LUX DAYLIGHT PICTURE SCREEN CORPORATION, OF NEW YORK, N. Y., A CORPORATION OF DELAWARE

PROJECTOR

Application filed June 8, 1926. Serial No. 114,405.

This invention relates to a novel and improved projector, and more particularly to certain details of construction of the lamp house and condenser housing.

One of the principal objects of my invention is to provide improved means for mounting the lenses in the condenser housing in such a way as to avoid injury due to expansion thereof. These lenses are subjected to intense heat from the lamp, which will cause expansion thereof. Means should be provided for taking up this expansion and various devices have been tried with this object in view. None of these devices have, however, been satisfactory, if for no other reason, because of their complicated character. The means which I provide is extremely simple in character and will effectively avoid injury to the lenses due to expansion thereof, and at the same time will hold them in proper position.

Another object of my invention is to provide a construction of condenser housing composed of a few simple parts whereby the housing may be assembled with the lenses in proper position with the minimum amount of trouble. When assembled, the housing is so constructed that it may be easily secured in position in relation to the lamp house.

Still another object of my invention is to provide improved means for supporting and adjusting the lamp in the lamp house. The lamp in a projector is usually secured in position with the filament or other source of light in correct relation to the reflector and condenser so far as is possible to do so. After installation, however, a minor adjustment may be necessary and the means which I provide for making such adjustment is of extremely simple character and such as may be readily made.

A further object of my invention is to provide a means of improved and very simple character for bodily adjusting the unit formed by the lamp house and condenser in relation to the rest of the optical system. The elements of the optical system are designed to occupy a certain definite relation to one another, but because of inaccuracies of manufacture this relation may not be accurately established when the system is assembled. The means which I provide is extremely simple in character and the adjustment may be made with corresponding ease.

A still further object of my invention is to provide means of novel and improved character for securing the reflector to the lamp house, and in such a manner as to permit ready adjustment thereof in respect to the lamp contained within the house.

In the accompanying drawings, in which I have shown a selected embodiment of my invention, Fig. 1 is a vertical longitudinal section through the lamp house and condenser housing taken on the line 1, 1, of Fig. 2.

Fig. 2 is a section on line 2, 2, of Fig. 1.

Fig. 3 is a section on the line 3, 3, of Fig. 1.

Fig. 4 is a perspective view of one of the lenses forming the condenser.

Fig. 5 is an enlarged sectional view taken on the plane of Fig. 1 and showing details of the reflector mounting.

Fig. 6 is a view of the structure shown in Fig. 5 viewed from the left of that figure.

Fig. 7 is a section on the line 7, 7, of Fig. 6.

Referring, now, to the drawings in detail, the numeral 1 designates a frame upon which the various parts of a projector may be mounted. The projector with which my invention is employed may be of any usual or suitable form, but I have shown the invention as employed with the type of projector described and claimed in my co-pending application Serial No. 114,404, filed June 8, 1926. The lamp house 2 and condenser housing 3 are secured together as one unit and hinged to the frame 1 by means of the bracket 4 which is pivoted upon the hinged pintle 5, this pintle passing through hinge lugs 6 and 7 upon the frame 1 and ears 8 on the bracket 4. In the lamp house 2 is supported a suitable lamp 9 and a reflector 10. The rays of light from the lamp and reflector pass through the condenser formed by the lenses 11, 12 and 13, these lenses forming a light beam in the usual and well known manner, and this beam is received upon the mirror 14 and by this mirror directed to other parts of the optical system which form no part of this invention and are therefore not shown. When the lamp house and condenser are in operative relation to the mirror 14, the parts are secured in that position by means of the bracket 15 suitably secured to the frame, as by bolts 16. These bolts pass through openings in the bracket and in the frame, and the openings in one or the other of these elements are slotted to permit a slight vertical movement, for a purpose which will presently appear.

The projector described in my aforesaid co-pending application comprises a conveyor in the form of a flexible continuous band adapted to contact with the face of the guides 17 adjacent its margins. This conveyor brings the slides to position for projection upon a screen or the like by means of the beam of light emanating from the condenser. The conveyor forms no part of the invention of this application, and to avoid confusion has been omitted from the drawings.

The guides are provided with outstanding ears 18, which, in this case, are two in number, to receive bolts 19 which pass through the brackets 4 and 15, respectively, to hold the condenser housing and lamp house to these brackets. The housing 3 is provided with laterally extending ribs 20 which are bored to receive the bolts 19 and thus secure the housing to the brackets. Disposed behind the housing 3, is a member 20′ having laterally extending ears 21 through which the bolts 19 pass. The member 20′ extends laterally through the lamp house 2, as best shown in Figs. 2 and 3, the front wall of the lamp house being apertured for this purpose. At the top and bottom, the member is provided with circular flanges 22 which fit within the front wall of the lamp house and the house is suitably secured to these flanges, as by screws 23. The lens 13 which is of the plano-convex form shown has its plane face disposed toward the mirror 14 and contacts with the guides 17 against which it is held by transversely disposed resilient elements 24. These elements may conveniently be formed of wire and the ends of the elements may be bent over, as shown at 25, after passing through apertures in the sides of the housing. It is obvious that these wires will be tangent to the convex surface and will have contact therewith at substantially a single point. A similar pair of resilient elements 24 is employed to hold the plano-convex lens 12 with its plane surface in contact with shoulders 26 located adjacent the top and bottom of the member 20′. The member 20′ is provided with an aperture 27 which decreases in cross section toward the lamp and at the end of the aperture adjacent the lamp there is disposed the plano-convex lens 11. This lens is held in position with its plane surface in contact with plates 28 of a width substantially the same as the guides 17 and, like the guides, provided with outstanding ears 29 to receive the bolts 19. The means for holding the lens 11 against the plates 28 may comprise a third pair of retaining elements 24 similar in all respects to the other elements 24 described above.

The above arrangement exemplifies means for ready construction and assemblage of the various parts of a condenser together with means for securing together in one unit the condenser housing and the lamp house. The resilient elements 24 yieldingly hold the various lenses in position and at the same time permit the lenses to expand under the action of heat.

The various lenses are of the same form, best shown in Fig. 4, wherein is shown a perspective view of the lens 12. It will be seen that this lens is noncircular although symmetrical on its horizontal and vertical axes. The noncircular construction may be readily achieved by cutting away opposite sides of a circular lens, as at 30, to form straight edges to engage the vertical sides of the condenser housing. The noncircular form of the lens co-operating with a corresponding shape of housing holds the lens against rotation in the housing wall, while the resilient element 24 prevents the movement of a lens longitudinally of its axis, but at the same time permits such expansion along this axis as may occur. Due to the fact that the contact between each lens and the resilient element is limited to a small area, substantially a point, the lenses will be very lightly but firmly held in position and the danger of fracture due to expansion against a strong retaining force is eliminated.

The entire assemblage of lamp house and condenser housing is supported by the brackets of which the bracket 4 is hinged to the pintle 5. The axis of the condenser is designed to coincide with the axis of the mirror 14 which represents the remainder of the optical system. Due to inaccuracies of manufacture, however, the proper relation may not be obtained and therefore I provide a certain amount of play between the hinge lugs 6 and 7 and the ears 8, as shown in Fig. 1. This play is taken up by means of a plurality of washers 31. These washers may be distributed between either ear 8 and the corresponding lug 6 or 7 to give the desired height of the condenser housing in relation to the rest of the optical system. This means of adjusting is extremely simple in character and easy to operate. Moreover, after it is once made, it cannot be accidentally disturbed.

Referring to Figs. 1 and 2, it will be seen that the lamp base 32 is secured in position upon a transverse frame 33 forming part of the lamp house base 34. The lamp base 32 may be provided with ears 35 apertured to receive bolts 36 which pass through the frame 33 to secure the lamp base to the frame. The frame and base are so designed in respect to the lamp filament that the filament will be in correct position in respect to the axis of the condenser. It may be found necessary, however, to raise or lower the filament slightly and to bring it closer to or farther away from the condenser. For this purpose, I provide transverse arms 37 on the frame 33, each arm having threaded thereinto adjacent one end a screw 38, the upper end of which contacts with the base 32. By this means, it is apparent that the base may be tipped upon the frame so as to vary the distance between the filament and the condenser. If necessary, the bolts 36 may be loosened to permit raising of the filaments thus providing a vertical adjustment. Ordinarily, the tilting or tipping adjustment of the frame is so slight that it can be made without loosening the bolts 36.

The reflector 10 is secured to the rear wall of the lamp house 2 by means now to be described. This wall is apertured at 39 to receive the two vertically disposed bolts 40. It will be seen that the aperture 39 is in the form of a vertically elongated slot. Disposed against the outside of the wall is a plate 41 having an aperture 42 corresponding to the aperture 39 and registering therewith. The bolts 40 pass through these two apertures in which are disposed suitable washers 43 surrounding the bolts. Each bolt is further provided with a washer 44 disposed beneath each nut 45 and contacting with the plate 41 adjacent the edge of the aperture 42, as best shown in Fig. 5. Disposed in opposite sides of the slot formed by the aperture 42 are adjusting screws 46, which screws extend through the wall of the housing and contact with the rear surface of the reflector 10. By the structure just described, the reflector may be adjusted about either its horizontal or vertical axis, in either case the adjustment being of a rocking nature. For adjustment about the horizontal axis one of the bolts 40 may be loosened and the other tightened. This will cause the reflector to roll or rock on the inner surface of the lamp house. To adjust the reflector about its vertical axis, the adjusting screws 46 may be manipulated, one being loosened and the other tightened. This action will cause the reflector to rock, the rocking taking place between the plate 41 and the washers 44.

From the above it will be apparent that I have devised a projector of novel and improved form in which the various objects set forth at the beginning of the specification have been achieved by constructions which are simple and rugged in character and yet will be efficient in operation. The constructions shown are particularly adapted to a projector of a type intended to display advertising matter or other information without the presence of an attendant. In such apparatus, it is common to start the device in operation and leave it for a long period of time. A projector constructed according to my invention when once adjusted is of such character that it will not become deranged with ordinary or even rough usage.

I am aware that various changes in details may be made within the scope of my invention and I do not intend to limit myself except by the appended claims.

I claim:

1. In combination, a housing, a lens disposed therein, relatively rigid means engaging one face of said lens, and a resilient element disposed substantially tangent to the other face of said lens only at substantially a single point, said element extending across said housing and secured to the walls thereof, said element yieldingly holding said lens against said rigid means.

2. In combination, a housing, a lens disposed therein and having two faces, one of which is convex, relatively rigid means engaging the other face of said lens, and a resilient element extending across said housing and substantially tangentially engaging said convex face only at substantially a single point.

3. In combination, a condenser housing having a noncircular side, a lens in said housing having a noncircular edge co-operating with said noncircular side to prevent rotation of said lens in said housing, and means resiliently holding said lens against movement longitudinally of said housing, said resilient means permitting such movement of said lens longitudinally of said housing as may be effected in response to rise in the lens temperature.

4. In combination, a housing, a lens disposed therein, said housing and lens having configurations co-operating to prevent relative rotation thereof about the axis of said lens, and yieldable means impeding movement of said lens in a direction parallel to its axis, said yieldable means permitting such movement of said lens in a direction parallel to its axis as may be effected in response to rise in the lens temperature.

5. In combination, a housing, a lens disposed therein, relatively rigid means engaged by one face of said lens, and a plurality of separate resilient elements engaging the other face of said lens at substantially opposite edges thereof, said elements being anchored to thereby hold said lens against said rigid means.

6. In a projection system, a lamp housing having an opening, a lamp therein, a lens housing, a lens in said lens housing and clamped at its periphery against the surface defining said opening, and another lens between said lamp and said first named lens, a beam of light emanating from said lamp passing through said lenses in succession.

In testimony whereof, I have affixed my signature to this specification.

WILFRED T. BIRDSALL.